Patented July 29, 1952

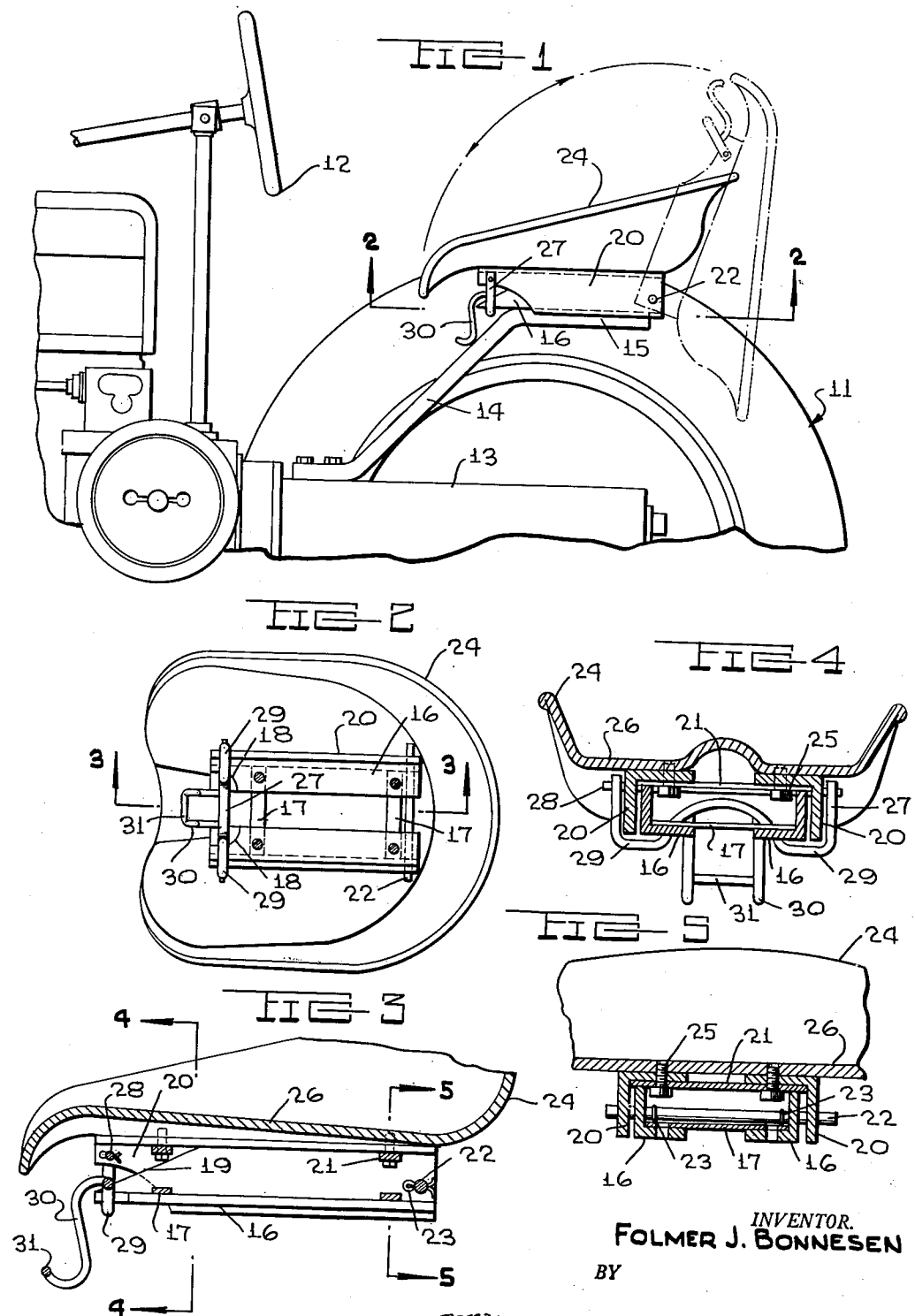

2,604,927

UNITED STATES PATENT OFFICE 2,604,927

TRACTOR TILT-BACK SEAT BRACKET

Folmer J. Bonnesen, Elk Horn, Iowa

Application January 26, 1951, Serial No. 207,893

2 Claims. (Cl. 155—51)

This invention relates to seat construction, and more particularly to a tiltable driver's seat for a tractor.

A main object of the invention is to provide a novel and improved driver's seat construction for a tractor which is arranged so that the seat may be tilted to an out-of-the-way position enabling the driver to stand up at times while driving the tractor, the arrangement enabling the seat to be tilted to a position wherein it will be protected against rain when the tractor is not in use, and the arrangement providing easy manipulation of the seat from its operative to its inoperative position and vice versa.

A further object of the invention is to provide an improved tiltable seat structure for a tractor, said seat structure being simple in construction, being inexpensive to fabricate, being substantially self-locking so as to prevent the seat from accidentally being tilted to inoperative position, and being easy to manipulate when it is desired to move the seat to its inoperative position, or to move the seat from its inoperative position to its operative position.

Further objects and advantages of the invention will become apparent from the following description and claims, and from the accompanying drawings, wherein:

Figure 1 is a fragmentary, side elevational view of a tractor provided with an improved tiltable seat structure in accordance with the present invention;

Figure 2 is a cross-sectional view taken on the line 2—2 of Figure 1;

Figure 3 is an enlarged cross-sectional, detail view taken on line 3—3 of Figure 2;

Figure 4 is a cross-sectional, detail view taken on line 4—4 of Figure 3;

Figure 5 is a fragmentary cross-sectional, detail view taken on line 5—5 of Figure 3.

Referring to the drawings, 11 designates a conventional tractor provided with the usual steering wheel 12 mounted on the frame 13. Designated at 14 is an upwardly and rearwardly inclined seat post which is secured to the frame 13 rearwardly of the steering wheel 12 and which is formed at its top end with the horizontal, longitudinally extending portion 15. Secured to the horizontal portion 15 are the opposed, longitudinally extending angle bars 16, 16 having their horizontal flanges extending inwardly toward each other and connected together by transverse bar members 17, 17, as shown in Figure 2. The forward corners of the horizontal flanges of the angle bars 16 are notched out, as shown at 18, 18, and the forward portions of the vertical flanges of said angle bars are tapered, as shown at 19.

Designated at 20, 20 are respective, longitudinally extending angle bars which are connected by transverse cross-bars 21 to define a generally channel-shaped, downwardly facing structure which fits over the upwardly facing channel-like structure defined by the angle bars 16, 16 connected by cross-bars 17, 17. The depending, longitudinal flanges of the angle bars 20, 20 are pivotally connected to the vertical flanges of the angle bars 16, 16 by a transverse rod 22 extending through the rear portions of said flanges and secured by the cotter pins 23, 23 extending through the rod and located inwardly adjacent to the vertical flanges of the angle bars 16, 16. Designated at 24 is the seat which is secured to the angle bars 20, 20 by bolts 25 extending through the crossbars 21 and the top flanges of the angle bars and threadedly engaging in the lower wall 26 of the seat 24, as shown in Figure 5. As shown in Figure 1, the seat 24 may be swung rearwardly to the dotted line, inoperative position shown in said figure, the seat pivoting around the transverse rod 22.

Designated at 27 is a generally U-shaped bail member which is pivotally secured to the vertical flanges of the angle bars 20, 20, as by a transverse rod 28 extending through the ends of the arms of said bail member and through the vertical flanges of the angle bars 20, 20, as shown in Figure 4. The U-shaped bail member 27 is formed with the spaced loops 29, 29 adapted to engage around the forward ends of the respective angle bars 16, 16 in the manner shown in Figure 3, to thereby lock the seat 24 in its operative position. Secured to the bight portion of the bail member 27 is the curved handle loop 30, said handle loop being generally U-shaped and being formed with the forwardly offset bight portion 31. The member 30 serves both as a handle for rotating the U-shaped member 27 out of locking position, and also as a weight to bias said member 27 toward the locking position thereof shown in Figure 3.

To move the seat 24 to its inoperative position, it is merely necessary for the operator to grasp the bight portion 31 of handle 30 and pull outwardly thereon, causing the U-shaped member 27 to be rotated out of engagement with the forward ends of the angle bars 16, 16, the upward pull on the handle 30 causing the seat 24 to be rotated upwardly and rearwardly to the dotted line position shown in Figure 1, wherein the weight of the seat will maintain said seat stationary until the operator desires to restore the seat to its normal, horizontal position shown in full lines in Figure 1. When the seat is returned to its horizontal position by being rotated counterclockwise from the position shown in dotted view in Figure 1, the U-shaped locking member 27 slips over the beveled edges 19 of the angle bars 16 and lockingly engages around the front ends of said angle bars 16 in the manner shown in Figures 1 and 3. As above explained, the weight of the handle 30 will then maintain the U-shaped locking member 27 in locking position, thereby securing the seat 24 in its horizontal position.

While a specific embodiment of an improved tiltable seat structure for tractors has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a tractor, an upwardly and rearwardly inclined seat post, a horizontal, upwardly facing, generally channel-shaped bracket secured to the top end portion of said seat post and projecting forwardly over said seat post, a seat pivoted to the rear portions of the side flanges of said bracket for swinging movement in a vertical plane, a U-shaped bail member pivoted to said seat and being arranged to lockingly engage over the forwardly projecting portion of said bracket, and a handle secured to said bail member and projecting forwardly thereof, the weight of the handle being arranged to bias the bail member into locking engagement over said forwardly projecting portion of said bracket.

2. In a tractor, an upstanding seat post, a horizontal upwardly facing channel shaped bracket secured to the top portion of said post, a second horizontal downwardly facing channel shaped structure arranged in longitudinal facing relation with respect to said bracket and connected at one end to the adjacent one end of said bracket for swinging movement into and out of engagement with said bracket, a seat superimposed upon and rigidly secured to said structure, and a U-shaped bail member arranged transversely of said structure adjacent the other end thereof and having the free ends pivotally connected to said structure for swinging movement in a vertical plane with its bight engageable with the other end of said bracket.

FOLMER J. BONNESEN.

REFERENCES CITED

The following references are of record in the file of this patent:

UNITED STATES PATENTS

| Number | Name | Date |
|---|---|---|
| 1,468,872 | Beskow | Sept. 25, 1923 |
| 2,269,968 | Baker | Jan. 13, 1942 |
| 2,533,573 | Gabel | Dec. 12, 1950 |
| 2,558,049 | Hersey | June 26, 1951 |
| 2,563,277 | Roeder | Aug. 7, 1951 |